(12) United States Patent
Staats, Jr. et al.

(10) Patent No.: US 11,031,744 B1
(45) Date of Patent: Jun. 8, 2021

(54) BELT STRUCTURES FOR ROTARY ELECTRICAL CONTACT DEVICE

(71) Applicant: National Technology & Engineering Solutions of Sandia, LLC, Albuquerque, NM (US)

(72) Inventors: Wayne Lawrence Staats, Jr., Livermore, CA (US); Jeffrey P. Koplow, San Ramon, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 153 days.

(21) Appl. No.: 16/420,670

(22) Filed: May 23, 2019

(51) Int. Cl.
| | | |
|---|---|---|
| *H01R 39/28* | (2006.01) | |
| *F16G 9/00* | (2006.01) | |
| *H02K 13/10* | (2006.01) | |
| *H01R 43/16* | (2006.01) | |
| *H01B 5/10* | (2006.01) | |
| *F16H 7/04* | (2006.01) | |

(52) U.S. Cl.
CPC ............... *H01R 39/28* (2013.01); *F16G 9/00* (2013.01); *F16H 7/04* (2013.01); *H01B 5/104* (2013.01); *H01R 43/16* (2013.01); *H02K 13/10* (2013.01)

(58) Field of Classification Search
CPC ........... H01R 39/28; H01R 43/16; F16G 9/00; H01B 5/104
USPC .......................................................... 439/13
See application file for complete search history.

(56) References Cited

U.S. PATENT DOCUMENTS

| | | | | |
|---|---|---|---|---|
| 4,023,425 A | * | 5/1977 | Parker | ..................... F16H 55/56 474/16 |
| 4,135,869 A | * | 1/1979 | Loyer | ....................... B21F 3/02 425/71 |
| 4,143,558 A | * | 3/1979 | Van Deursen | ........ F16H 63/065 474/28 |
| 4,229,988 A | * | 10/1980 | Rattunde | ................... F16H 9/18 474/28 |
| 5,182,968 A | * | 2/1993 | Mott | ................. F16H 61/66272 474/11 |
| 5,427,578 A | * | 6/1995 | Iijima | ....................... F16H 9/12 474/18 |

(Continued)

OTHER PUBLICATIONS

International Search Report of the International Searching Authority dated May 18, 2011 for PCT/US2012/038698, 3 pages.

*Primary Examiner* — Alexander Gilman
(74) *Attorney, Agent, or Firm* — Medley, Behrens & Lewis, LLC (57) ABSTRACT

Technologies pertaining to a rotary electrical contact device are described herein. A rotary electrical contact device comprises a first sheave that is disposed about a first axis and a second sheave that rotates about the first axis or a second axis that is parallel to the first axis. The device further includes two planetary sheaves that revolve around the first and second sheaves, and a belt that makes contact with each of the sheaves, the belt comprising a co-wound inner helical coil and outer helical coil. As the first sheave rotates, the planetary sheaves revolve about the first and second sheaves and cause the belt to deform and roll along the second sheave. The belt makes rolling contact with the four sheaves. The belt is electrically conductive such that as the belt rolls along the sheaves, the belt maintains electrical contact between the first sheave and the second sheave.

20 Claims, 8 Drawing Sheets

(56) References Cited

U.S. PATENT DOCUMENTS

| | | | | |
|---|---|---|---|---|
| 5,556,346 A * | 9/1996 | Genzel | F16H 61/66272 | 474/18 |
| 5,683,318 A * | 11/1997 | Snel | F16H 37/021 | 474/11 |
| RE35,820 E * | 6/1998 | Guginsky | F16L 11/18 | 174/102 R |
| 5,871,411 A * | 2/1999 | Senger | F16H 61/66254 | 474/11 |
| 6,099,424 A * | 8/2000 | Tsai | F16H 61/662 | 474/12 |
| 6,537,176 B2 * | 3/2003 | Fessler | F16H 61/66259 | 474/28 |
| 6,612,949 B2 * | 9/2003 | Pelders | F16H 61/66272 | 474/69 |
| 6,962,542 B2 * | 11/2005 | Van Spijk | F16H 55/56 | 474/18 |
| 7,174,245 B2 * | 2/2007 | Ries-Mueller | F16H 61/66272 | 477/45 |
| 7,270,591 B2 * | 9/2007 | Deshpande | B24B 23/03 | 451/357 |
| 7,301,100 B2 * | 11/2007 | Drane | H02G 3/088 | 174/481 |
| 7,794,344 B2 * | 9/2010 | Ishioka | F16H 61/66259 | 474/28 |
| 7,837,537 B2 * | 11/2010 | Wall | B24B 21/20 | 451/296 |
| 7,959,104 B2 * | 6/2011 | Kuntz | A63H 33/003 | 244/2 |
| 7,959,361 B2 * | 6/2011 | Lu | G02B 6/3826 | 385/53 |
| 8,100,791 B2 * | 1/2012 | Yamaguchi | F16H 63/065 | 474/28 |
| 8,585,413 B2 * | 11/2013 | Koplow | H02K 31/02 | 439/18 |
| 8,600,634 B2 * | 12/2013 | Van Der Sluid | F16H 61/66272 | 701/61 |
| 8,957,559 B2 * | 2/2015 | Schneider | H02K 7/116 | 310/89 |
| 9,182,017 B2 * | 11/2015 | Yoshida | F16H 9/125 | 474/8 |
| 2001/0044349 A1 * | 11/2001 | Tanigawa | F16H 9/125 | 474/8 |
| 2002/0142870 A1 * | 10/2002 | Okano | F16H 9/125 | 474/28 |
| 2003/0081905 A1 * | 5/2003 | Bethea | G02B 6/3813 | 385/55 |
| 2003/0216200 A1 * | 11/2003 | List | F16H 63/067 | 474/28 |
| 2004/0033851 A1 * | 2/2004 | Lubben | F16C 33/586 | 474/8 |
| 2004/0214669 A1 * | 10/2004 | Katou | F16H 61/66272 | 474/28 |
| 2005/0192132 A1 * | 9/2005 | Faust | F16H 63/065 | 474/18 |
| 2006/0052192 A1 * | 3/2006 | Walter | F16H 63/065 | 474/28 |
| 2006/0058127 A1 * | 3/2006 | Walter | F16H 55/56 | 474/8 |
| 2006/0231282 A1 * | 10/2006 | Greenfield | H02G 3/14 | 174/67 |
| 2009/0017958 A1 * | 1/2009 | Kurihara | F16H 37/0846 | 475/210 |
| 2009/0286411 A1 * | 11/2009 | Bazayev | H01H 9/0264 | 439/145 |
| 2010/0184543 A1 * | 7/2010 | Yamashita | F16H 63/062 | 474/11 |
| 2010/0240480 A1 * | 9/2010 | Ogawa | F16H 55/56 | 474/28 |
| 2011/0067425 A1 * | 3/2011 | Taylor | F04C 29/0085 | 62/236 |
| 2011/0104919 A1 * | 5/2011 | Patel | H01R 13/6658 | 439/137 |
| 2011/0223785 A1 * | 9/2011 | Jiang | H01R 25/003 | 439/106 |
| 2011/0284216 A1 * | 11/2011 | Addis | E21B 47/01 | 166/250.01 |
| 2012/0002356 A1 * | 1/2012 | Linnane | H02G 3/26 | 361/679.01 |

* cited by examiner

BELT STRUCTURES FOR ROTARY ELECTRICAL CONTACT DEVICE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Electric machines commonly require conduction of electric current between a rotating structure or member and a stationary structure. Conventionally, such conduction is achieved by providing a rotary electrical contact comprised of a rotating metal ring and stationary graphite brushes spring loaded against the ring to maintain contact between the brushes and the ring. In the conventional rotary electrical contact, sliding contact between the metal ring and the graphite brushes during normal operation of an electric machine causes wear that degrades the brushes. Furthermore, this sliding contact can cause electrical arcing that causes ablation of the graphite brushes. As a result, conventional rotary electrical contacts have short lifetimes and require frequent maintenance to replace the graphite brushes and clean carbon dust resulting from wear of the brushes.

To address these and other problems, a rolling-contact rotary electrical contact was developed to provide an electrical connection between a stationary member and a rotating member through an electrically conductive belt by way of rolling contact between the belt and the members, rather than sliding contact. Embodiments of this rotary electrical contact are described in U.S. Pat. No. 8,585,413. Generally, such embodiments include a stationary sheave, a rotating sheave, a pair of planetary sheaves, and a belt that is wound around the sheaves and that maintains electrical contact with the sheaves as the rotating sheave rotates. A total electrical resistance of such a rotary electrical contact has been shown to be a function of a contact resistance between windings of the helical coil belt and the sheaves and a longitudinal resistance of the belt along a length of the belt.

SUMMARY

The following is a brief summary of subject matter that is described in greater detail herein. This summary is not intended to be limiting as to the scope of the claims.

Various technologies pertaining to a rolling-contact rotary electrical contact device are described herein. In an exemplary embodiment, a rotary electrical contact device comprises a first sheave that is disposed about a first axis. The device further comprises a second sheave that is offset from the first sheave, and that rotates about the first axis or a second axis that is parallel to the first axis. The device also includes two planetary sheaves that revolve around the first and second sheaves, and a belt that makes contact with at least a portion of each of the first sheave, the second sheave, and the two planetary sheaves. As the first sheave rotates, the planetary sheaves revolve about the first and second sheaves and cause the belt to deform and roll along the second sheave. The belt makes rolling contact with each of the four sheaves. The belt is electrically conductive such that as the belt rolls along the sheaves, the belt maintains electrical contact between the first sheave and the second sheave.

Belts for such rotary electrical contact devices had been made to allow the belt to be easily deformed along multiple different dimensions of the belt while maintaining a low electrical resistance of the belt. In order to achieve a belt that readily bends in multiple axes and that also has low electrical resistance, prior rolling-contact rotary electrical contact devices have typically used belts of various configurations of coiled, bundled, or wound conductive wires. Such configurations have generally exhibited low axial stiffness, and therefore cannot readily be placed under tension without deformation of the belt. As a result, during operation of a rolling-contact rotary electrical contact device, centrifugal force resulting from rotation of the device can cause loosening of the belt. Loosening of the helical coil belt can cause mechanical failure of the belt, decoupling of the belt from the sheaves, loosening of connections among bundled or wound conductors making up the belt, or simply loose contact with the sheaves that in turn increases the electrical resistance of the contact.

Various technologies pertaining to improved conductive belts for a rotary electrical contact device are described herein. In exemplary embodiments, the conductive belt comprises a first helical coil and a second helical coil. The first helical coil and the second helical coil are co-wound such that the second helical coil is wound around the first helical coil. The first helical coil is maintained in contact with the second helical coil by virtue of a radial spring force of the first helical coil that results from winding of the helical coils. A longitudinal electrical resistance of the conductive belt including the first helical coil and the second helical coil is reduced as compared to a longitudinal resistance of a belt consisting of a single helical coil. In further embodiments, the conductive belt can further include a substantially inextensible core element that is positioned inside the helical coils, such that the helical coils are wound around the core element. The core element prevents deformation of the belt when the belt is placed under tension. In an exemplary rotary electrical contact device, therefore, the conductive belt can be placed under tension to improve contact of the belt with the sheaves and lower the electrical resistance of the rotary electrical contact device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a rotary electrical contact device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
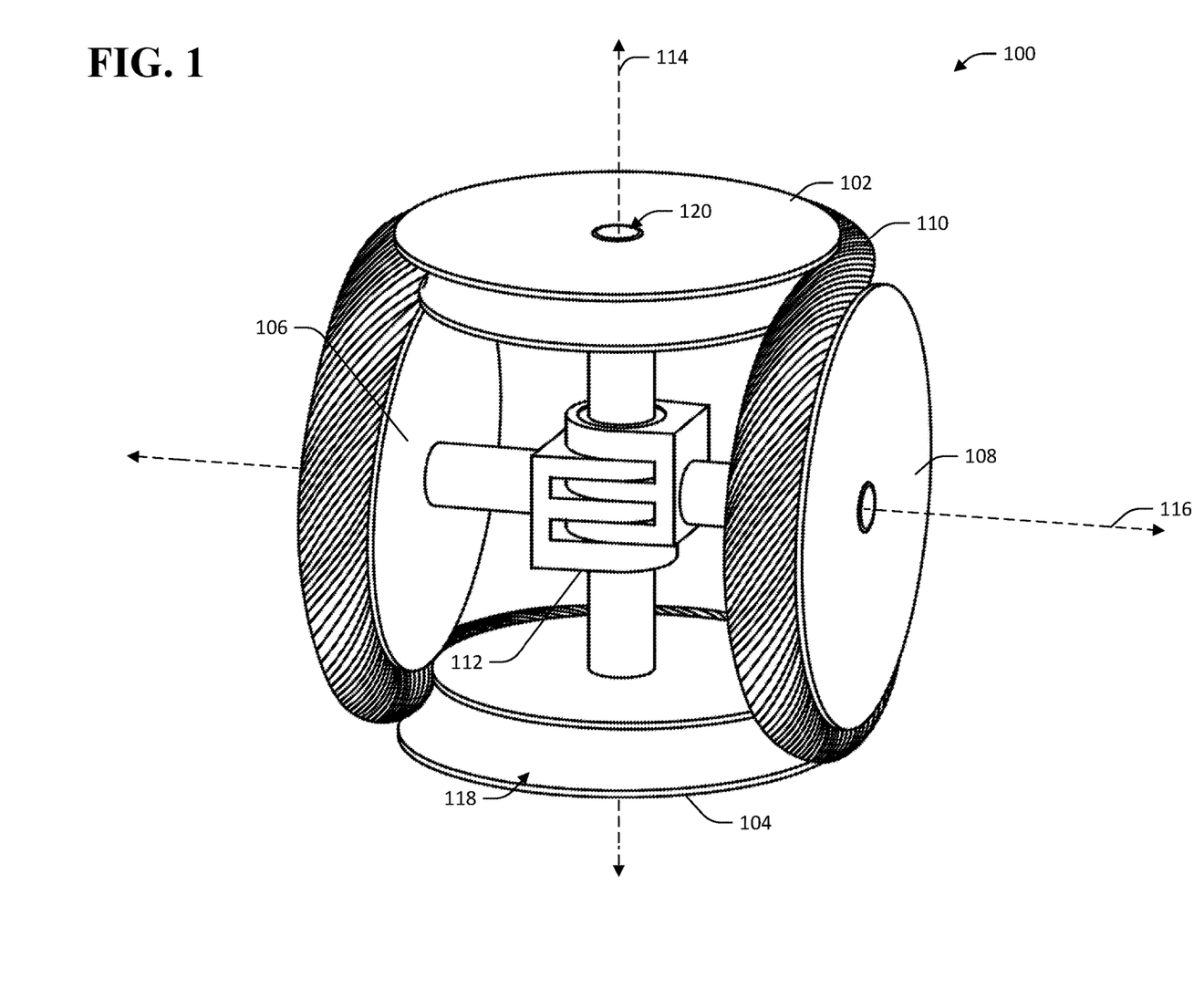
FIG. 1 depicts an exemplary rotary electrical contact device.

With reference to FIG. 1, an exemplary rotary electrical contact device 100 that facilitates conduction of electrical current from a rotating member to another member is illustrated. The device 100 includes a plurality of sheaves 102-108 and a belt 110 that is wound around the sheaves 102-108. The device 100 further includes a coupling mechanism 112 that can be coupled to one or more of the sheaves 102-108.

A first sheave 102 in the sheaves 102-108 is disposed about a first axis 114. In the exemplary device 100 shown in FIG. 1, a second sheave 104 in the sheaves 102-108 is also disposed about the first axis 114 and offset from the first sheave 102 along the first axis 114 such that the first sheave 102 and the second sheave 104 lie in substantially parallel planes. In other embodiments, the second sheave 104 can be disposed about a different axis that is parallel to the first axis 114. The first sheave 102 and the second sheave 104 are referred to herein collectively as primary sheaves 102, 104. The sheaves 102-108 further include a first planetary sheave 106 and a second planetary sheave 108. The first planetary sheave 106 is disposed about a second axis 116. In the exemplary rotary electrical contact device 100 shown in FIG. 1, the second planetary sheave 108 is disposed about the second axis 116. In other embodiments, the second planetary sheave 108 can be disposed about a different axis that is orthogonal to the first axis 114 but not coaxial with the second axis 116 (e.g., the second planetary sheave 108 can be positioned about a third axis that is at an angle relative to the axis 116). In the exemplary embodiment shown, the first axis 114 and the second axis 116 are orthogonal. In other embodiments, the first axis 114 and the second axis 116 are skew or intersect at an angle other than a right angle. In the exemplary rotary electrical contact device 100, each of the sheaves 102-108 has a groove formed therein (e.g., groove 118) that facilitates mating of the belt with the sheaves 102-108. In other embodiments, the sheaves 102-108 can be substantially cylindrical.

The sheaves 102-108 can further be made wholly or partially of a conductive material. By way of example, and not limitation, the sheaves 102-108 can each be made entirely of a conductive metal. For instance, the sheaves 102-108 can be made of copper or a copper alloy, silver or a silver alloy, aluminum, etc. In other examples, the sheaves 102-108 can be composed of oxygen-free high conductivity copper (e.g., having an oxygen content of 0.001% or less). In still other exemplary embodiments, an outer portion of the sheaves 102-108 can be made of a conductive material, while an inner portion of the sheaves 102-108 can be made of a material that is less conductive (e.g., a ceramic or steel). By way of example, and not limitation, the sheaves 102-108 can be made of a less conductive material from a center of the sheave to a diameter $D_1$, and be made of a more conductive material from the diameter $D_1$ to a diameter $D_2$, where $D_2$ is the total diameter of the sheaves 102-108 and $D_1 < D_2$.

The belt 110 is positioned around the sheaves 102-108 such that the belt makes contact with at least a portion of each of the sheaves 102-108. The belt 110 is electrically conductive and maintains electrical contact between the first primary sheave 102 and the second primary sheave 104. The belt 110 has a serpentine shape when installed in the device 100 in order to wrap around the sheaves 102-108 and maintain contact with the sheaves 102-108.

Operation of the rotary electrical contact device 100 is now described. In an exemplary application of the rotary electrical contact device 100, the first primary sheave 102 includes an opening 120 that can be coupled to a rotor of an electric machine such as a motor or generator. Rotation of the rotor (e.g., during operation of an electric machine) causes the first primary sheave 102 to rotate about the axis 114. The rotary electrical contact device 100 is configured to maintain electrical contact between the first primary sheave 102 and the second primary sheave 104 by way of the belt 110 while the first primary sheave 102 is rotating, whereas the second primary sheave 104 may be stationary or rotating (e.g., rotating at a different speed or in a different direction than the first primary sheave 102). The second primary sheave 104 can be or be included in a stator of an electric machine. As the first primary sheave 102 rotates about the first axis 114, the sheave 102 exerts forces on the belt 110 that in turn cause the belt 110 to exert forces on the planetary sheaves 106, 108. These forces tend to cause the planetary sheaves 106, 108 to revolve around the first axis 114. In the exemplary device 100, the coupling mechanism 112 couples the first primary sheave 102 to the planetary sheaves 106, 108 such that the planetary sheaves 106, 108 are free to rotate about the second axis 116. Thus, when the first primary sheave 102 rotates, the planetary sheaves 106, 108 roll along the belt 110 and revolve about the first axis 114. The coupling mechanism 112 can further rotatably couple the first primary sheave 102 to the second primary sheave 104 such that the first primary sheave 102 are maintained in a fixed position relative to each other.

The belt 110 is electrically conductive and therefore as the first primary sheave 102 rotates, the belt 110 maintains electrical contact between the first primary sheave 102 and the second primary sheave 104. In embodiments, electrical current can pass through the rotary electrical contact device 100 along various paths. In an example, electrical current can flow from the first primary sheave 102 into the belt 110, along a length of the belt 110, and then into the second primary sheave 104 at a point where the belt 110 makes contact with the second primary sheave 104. In another example, electrical current can flow from the first primary sheave 102 into the belt 110, then across or through the belt 110 into either or both of the planetary sheaves 106, 108, then into the belt 110 again, and finally across or through the belt 110 into the second primary sheave 104.

Figure 2:
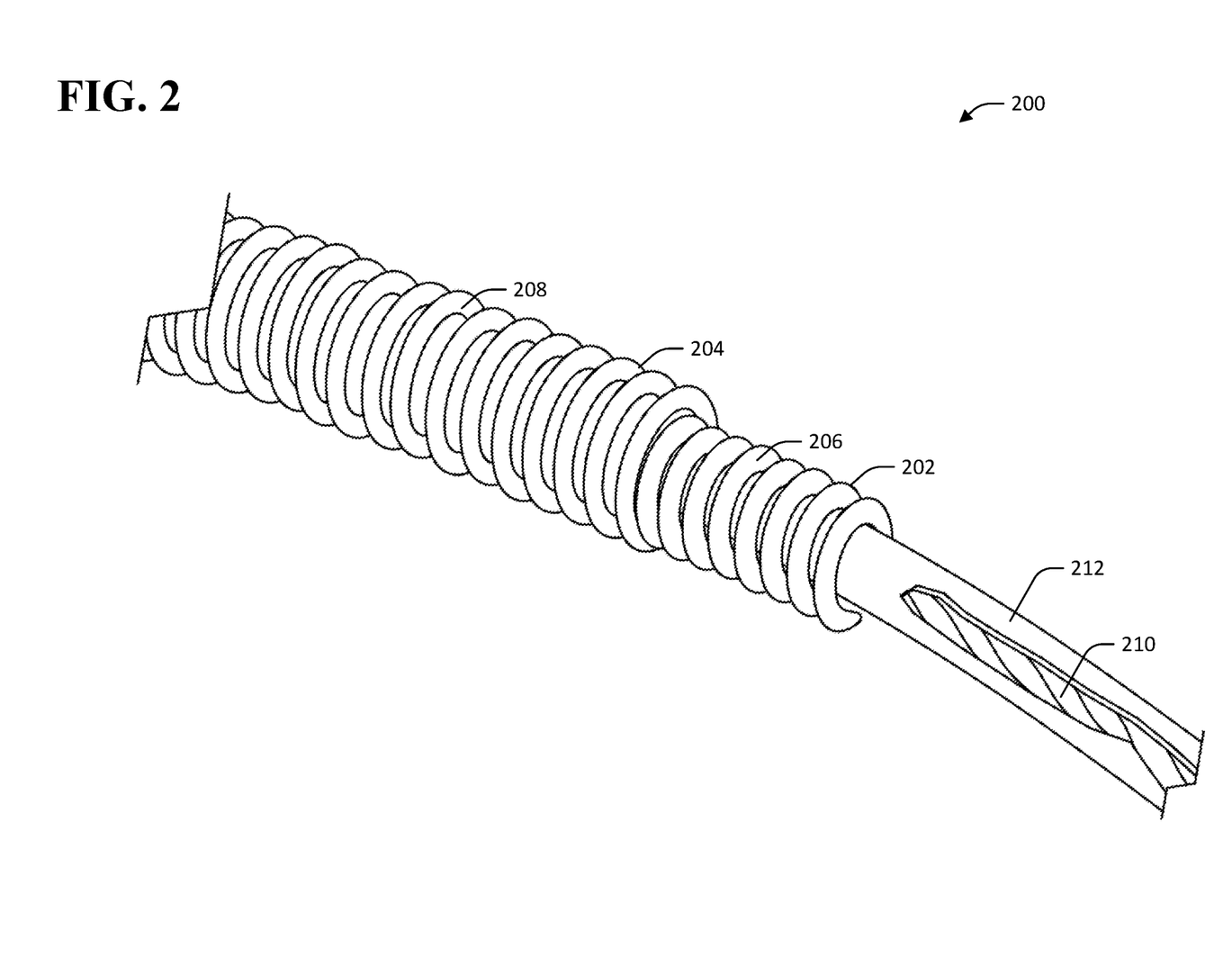
FIG. 2 depicts a partial perspective view of an exemplary conductive belt.

In exemplary embodiments, the belt 110 comprises two or more co-wound helical coils. Referring now to FIG. 2, a perspective cut view of an exemplary belt 200 is shown. The belt 200 comprises a first helical coil 202 and a second helical coil 204 that is wrapped around the first helical coil 202. The first helical coil 202 comprises a first plurality of windings 206 and the second helical coil 204 comprises a second plurality of windings 208. In a non-limiting example, the windings 206 of the first helical coil 202 can be formed by winding a conductive wire or other element around an axis. Continuing the example, the windings 208 of the second helical coil 204 can be formed by winding a second conductive wire or other element around the same axis as the first helical coil 202. In an exemplary embodiment, the first helical coil 202 and the second helical coil 204 are wound in a same direction (e.g., clockwise or counter-clockwise). The first helical coil 202 has a first diameter and the second helical coil 204 has a second diameter. The first diameter of the first helical coil 202 is smaller than the second diameter of the second helical coil 204 along a whole length of the belt 200 such that the second helical coil 204 surrounds the first helical coil 202 along the length of the belt 200. In exemplary embodiments, the first helical coil 202 and the second helical coil 204 have substantially uniform diameters along the length of the belt 200.

The first helical coil 202 and the second helical coil 204 can be maintained in contact with one another by radial spring forces resulting from the different diameters of the first helical coil 202 and the second helical coil 204. By way of example, when the first helical coil 202 and the second helical coil 204 are co-wound, the first helical coil 202 has a smaller radius than the second helical coil 204. As a result of the inner helical coil 202 having a smaller radius than the outer helical coil 204, the inner helical coil 202 has a greater amount of outward radial spring force than the outer helical coil 204. This is because there is more elastic springback of the smaller diameter coil compared to the larger coil. This spring force results in mechanical positive contact between the inner and outer electrically conductive coils, thereby providing increased electrical conductivity along the longitudinal axis of the belt.

In various embodiments, the first helical coil 202 and the second helical coil 204 have a same pitch, such that the first helical coil 202 and the second helical coil 204 have a same number of windings per unit length of the belt 200. In further embodiments, the windings 206, 208 of the helical coils 202, 204 can be offset from one another such that each of the windings 206 is in contact with two of the windings 208 and vice versa. By way of example, and referring now to FIG. 3, a partial cross-sectional view 300 of an exemplary conductive belt that comprises two co-wound helical coils is illustrated. The partial cross-section 300 is taken along an axis 302 that runs a length of the belt. The partial cross-section 300 shows a first plurality of windings 304a-304c of an inner helical coil of the belt and a second plurality of windings 306a-306d of an outer helical coil of the belt. As noted above, due to the smaller radius of the windings 304a-304c of the inner helical coil, the windings 304a-304c exhibit a spring force radially outward from the axis 302 that causes the windings 304a-304c to be maintained in contact with the windings 306a-306d of the outer helical coil. In partial cross-sectional view 300, each of the windings 304a-304c is maintained in contact with two adjacent windings in the windings 306a-306d. For example, the winding 304b of the inner helical coil is maintained in contact with adjacent windings 306b and 306c of the outer helical coil.

Figure 3:
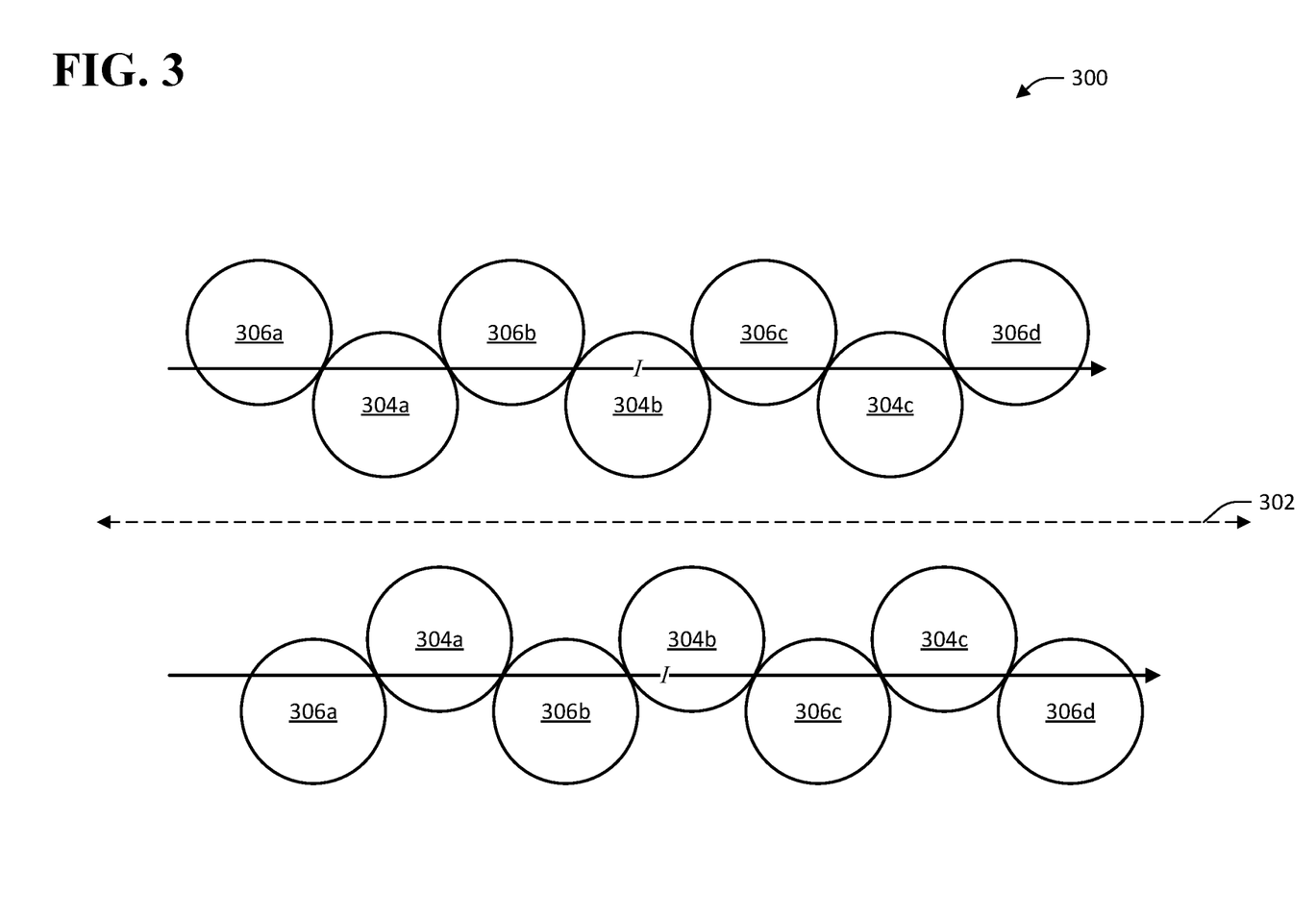
FIG. 3 is a partial cross-sectional view of an exemplary conductive belt.

By maintaining contact between the inner-coil windings 304a-304c and the outer-coil windings 306a-306d, an axial path for electrical current I is maintained along a length of the belt and substantially parallel to the length of the belt. In comparison to a helical current path that follows the windings of the coils, the axial path of electrical current I exhibits less electrical resistance, thereby reducing the resistance of a rotary electrical contact device in which the belt is used (e.g., the device 100). Furthermore, in contrast to a belt that includes only a single helical coil, a belt comprising an inner helical coil and an outer helical coil can be extended a greater amount in the axial direction before an axial current path such as shown for current I in FIG. 3 is broken (e.g., by breaking of contact between adjacent windings). In an example, if the belt is deformed along the direction of the winding axis 302, windings 306b and 306c of the outer coil will move away from one another, but winding 304b of the inner coil is pushed radially outward by the outward radial spring force of the inner coil so as to maintain contact with both of the windings 306b, 306c. It will be further understood that while the representative embodiment of FIG. 3 comprises helical structures wound from wire having a circular cross section, a variety of other cross-sectional shapes (e.g. a parallelogram instead of a circle) adapted to providing larger contact area between windings and/or reducing wear are contemplated.

In further embodiments, the belt 110 can include a core element that is substantially inextensible. By way of example, and referring again to FIG. 2, the belt 200 further comprises a core element 210 that is positioned such that the helical coils 202, 204 are wound around the core element 210. The belt 200 can further comprise a protective sheath 212 that surrounds the core element 210 and is positioned between the core element 210 and the coils 202, 204. In an embodiment, the sheath 212 includes a hollow tube in which the core element 210 is placed. In exemplary embodiments, the core element 210 is substantially inextensible. Stated differently, the core element 210 is configured such that the core element 210 can be placed under tension without significant deformation of the core element 210 (e.g., deformation of less than 1% of the length of the core element 210, deformation of less than 0.5% of the length of the core element 210, deformation of less than 0.1% of the length of the core element). Hence, the core element 210 can enable the belt 200 to be placed under tension without significant deformation of the belt 200. In various embodiments, the core element 210 can include an aramid or carbon fiber cord, or string, a wound steel cable, etc.

The protective sheath 212 protects the core element 210 from damage that may result from rubbing or pinching of the core element 210 by the helical coils 202, 204, such as fraying, breakage, etc. In some exemplary embodiments, the protective sheath 212 is configured to electrically insulate the core element 210 from the coils 202, 204. By way of an example, the protective sheath 212 can be composed of an insulating polymer. The sheath 212 also ensures that the core element remains centered along the length of the helical coils.

In contrast with previous rolling-contact rotary electrical contact devices, the belt 110 in the device 100 can be placed under tension without significantly increasing the resistance of the device 100 as a result of the features described herein. In the exemplary rotary electrical contact device 100, the belt 110 is placed under tension so as to maintain firm electrical contact between the belt 110 and the sheaves 102-108. The belt 110 can be placed under tension by appropriate selection of a size of the belt 110 and the sheaves 102-108 such that the sheaves 102-108 exert pressure on the belt 110 when the belt 110 is installed in the device 100.

Figure 4:
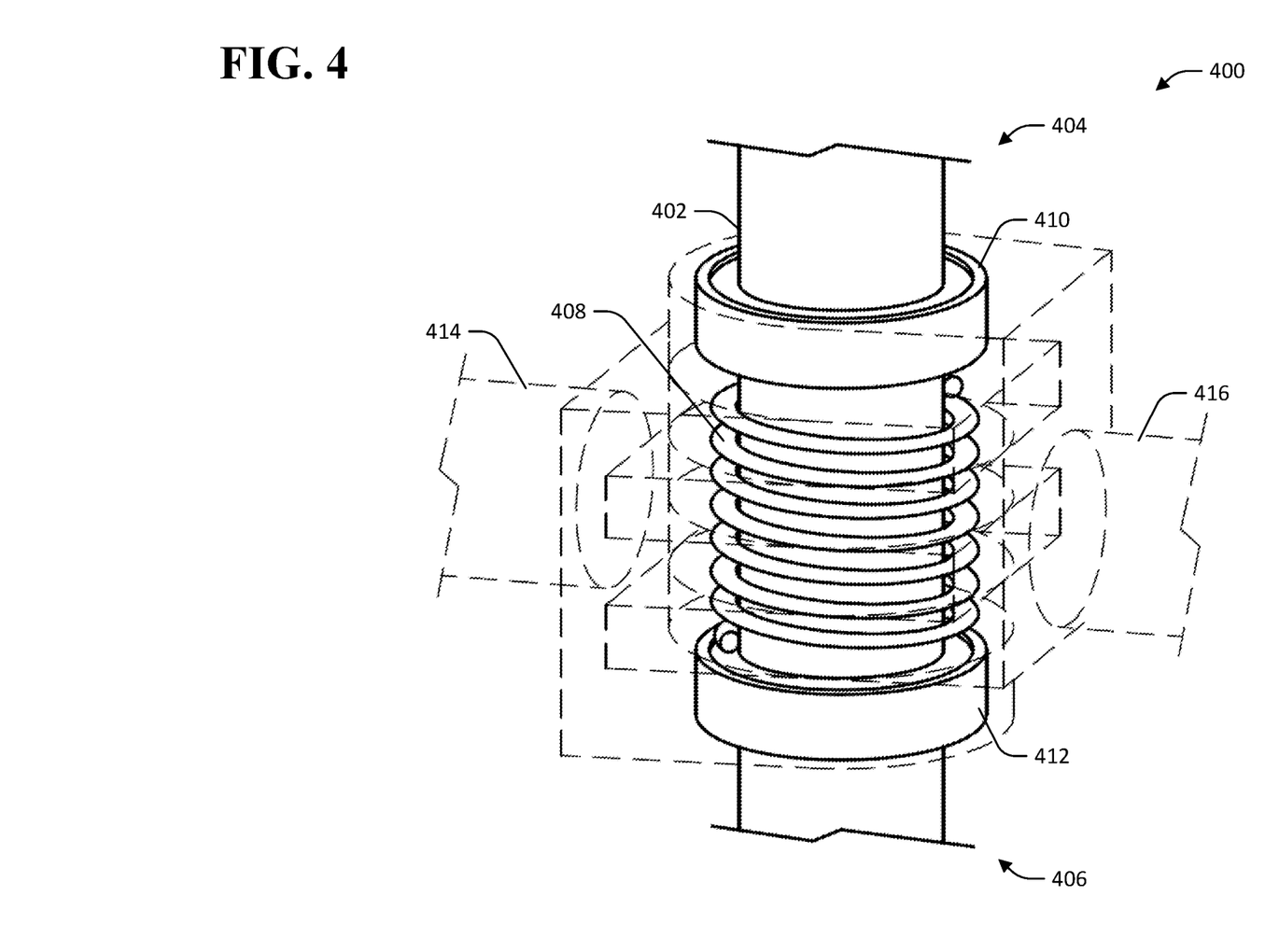
FIG. 4 is a cutaway view of an exemplary coupling mechanism.

In other embodiments, the belt 110 can be placed under tension by applying a force to an opposing pair of the sheaves 102-108 (e.g., a pair consisting of the sheaves 102, 104 or a pair consisting of the sheaves 106, 108). Such a force can be applied to the pair of sheaves by way of the coupling mechanism 112. By way of example, and referring now to FIG. 4, a cutaway view of an exemplary coupling mechanism 400 is shown, wherein the coupling mechanism includes a coupling arm 402 having a first end 404 and a second end 406. In an example embodiment, the first end 404 of the coupling arm 402 can be coupled to a first sheave in a rotary electrical contact device (e.g., the first primary sheave 102). Continuing the example, the second end 406 of the coupling arm 402 can be coupled to a second sheave in the rotary electrical contact device (e.g., the second primary sheave 104). The coupling mechanism 400 further includes a spring 408 that is coupled to the coupling arm 402, a first plate 410 that is positioned along the coupling arm 402, and a second plate 412 that is positioned along the coupling arm 402, wherein the spring 408 is positioned between the plates 410, 412. Still further, the coupling mechanism 400 includes a second coupling arm 414 and a third coupling arm 416. Further continuing the example, the second coupling arm 414 can be coupled a third sheave in the rotary electrical contact device (e.g., the first planetary sheave 106) and the third coupling arm 416 can be coupled to a fourth sheave in the rotary electrical contact device (e.g., the second planetary sheave 108). The spring 408 can be a torsional spring that exerts forces on the second and third coupling arms 414, 416 that tend to cause the arms 414, 416 to rotate about the first coupling arm 402. By way of example, and with reference again to FIG. 1, the coupling mechanism 112 therefore imparts forces to the planetary sheaves 106, 108 that tend to change the angular position of the sheaves 106, 108 about the axis 114. This in turn makes the pathlength that must be traversed by the belt 110 longer, thereby putting the belt in tension.

While an exemplary coupling mechanism 400 has been described herein, it is to be understood that the coupling mechanism 112 can be otherwise configured to apply forces to the sheaves 102-108. In exemplary embodiments, the coupling mechanism 112 can be configured to include compression springs, tension springs, torsion springs, etc. in order to apply forces to the sheaves 102-108 that cause the belt 110 to be placed under tension.

While various embodiments have been described herein relative to a belt comprising a first helical coil and a second helical coil, it is to be understood that a belt can be constructed to have more than two helical coils and remain consistent with the present disclosure. Furthermore it is to be understood that helical coils making up the belt 110 can be composed of a variety of different materials. In an example, the helical coils can comprise copper wires, aluminum wires, etc. In other examples, the helical coils can comprise multiple materials. For instance, the helical coils can be constructed of clad metal wires (e.g., copper-clad steel wire, gold-plated copper wire, etc.). In other embodiments, the first helical coil and the second helical coil can be made of different materials. By way of example, an outer helical coil can be composed of a harder material than the inner helical coil so that the outer helical coil exhibits greater durability when contacting the sheaves. In yet a further embodiment, the coating or cladding material used in the portion of the belt that makes contact with the sheaves may be different than a second cladding or coating applied to regions at which mechanical interlocking of adjacent windings occurs.

Figure 5:
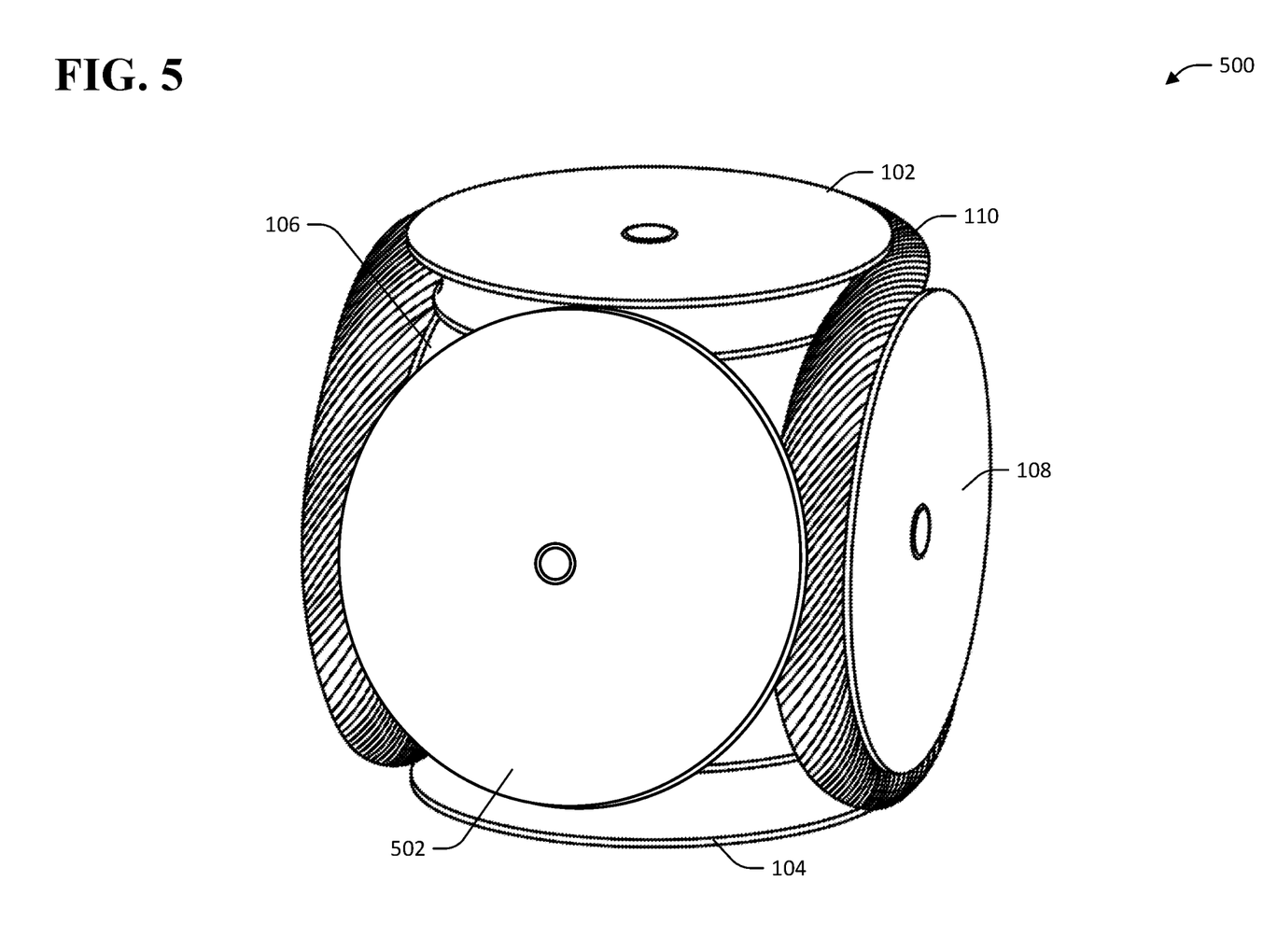
FIG. 5 depicts another exemplary rotary electrical contact device that includes an idler sheave.

Referring now to FIG. 5, another embodiment 500 of the exemplary rotary electrical contact device 400 is shown wherein the device 400 further comprises an idler sheave 502. The idler sheave 502 is positioned between the first primary sheave 102 and the second primary sheave 104 and between the first planetary sheave 106 and the second planetary sheave 108. A second idler sheave (not visible) can be positioned opposite the idler sheave 502, and is similarly positioned between the first primary sheave 102 and the second primary sheave 104 and between the first planetary sheave 106 and the second planetary sheave 108. During operation, the idler sheaves 502 revolve about the primary sheaves 102, 104. The idler sheaves 502 apply pressure to the belt 110 and the sheaves 102-108 so as to maintain firm contact between the belt 110 and the sheaves 102-108.

Figure 6:
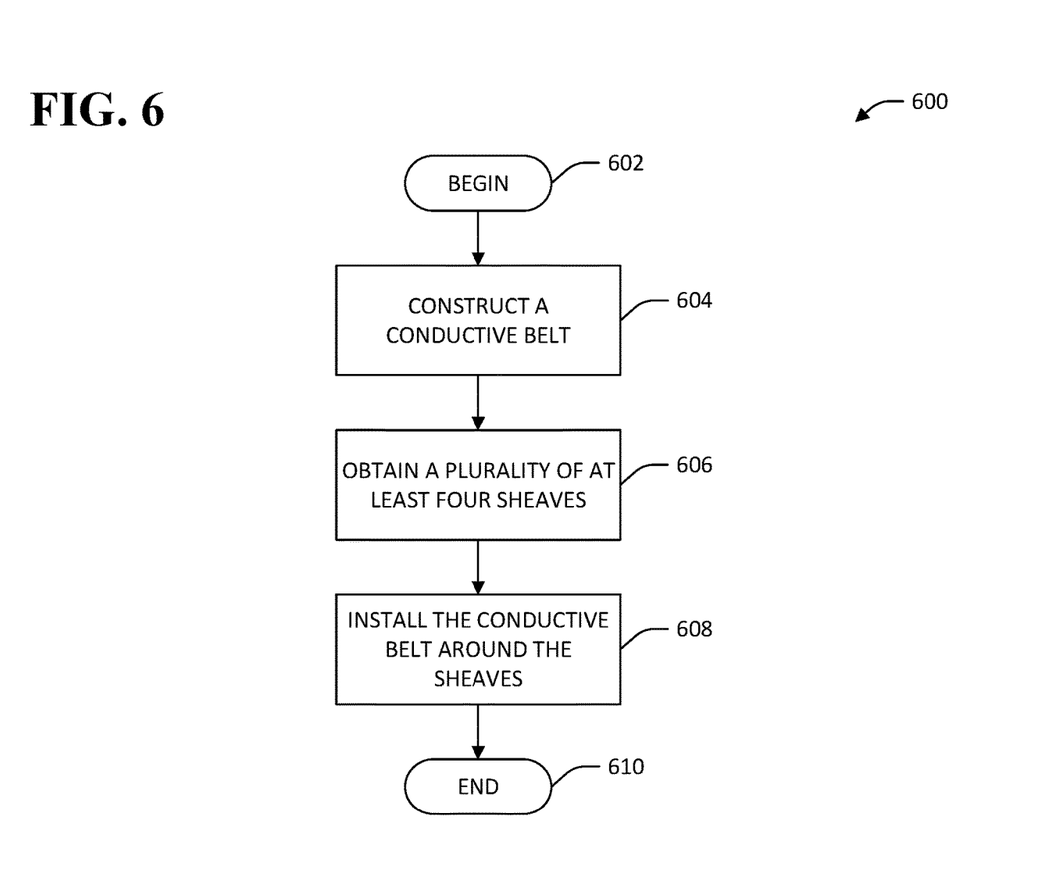
FIG. 6 is a flow diagram that illustrates an exemplary methodology for manufacturing a rotary electrical contact device.
Figure 7:
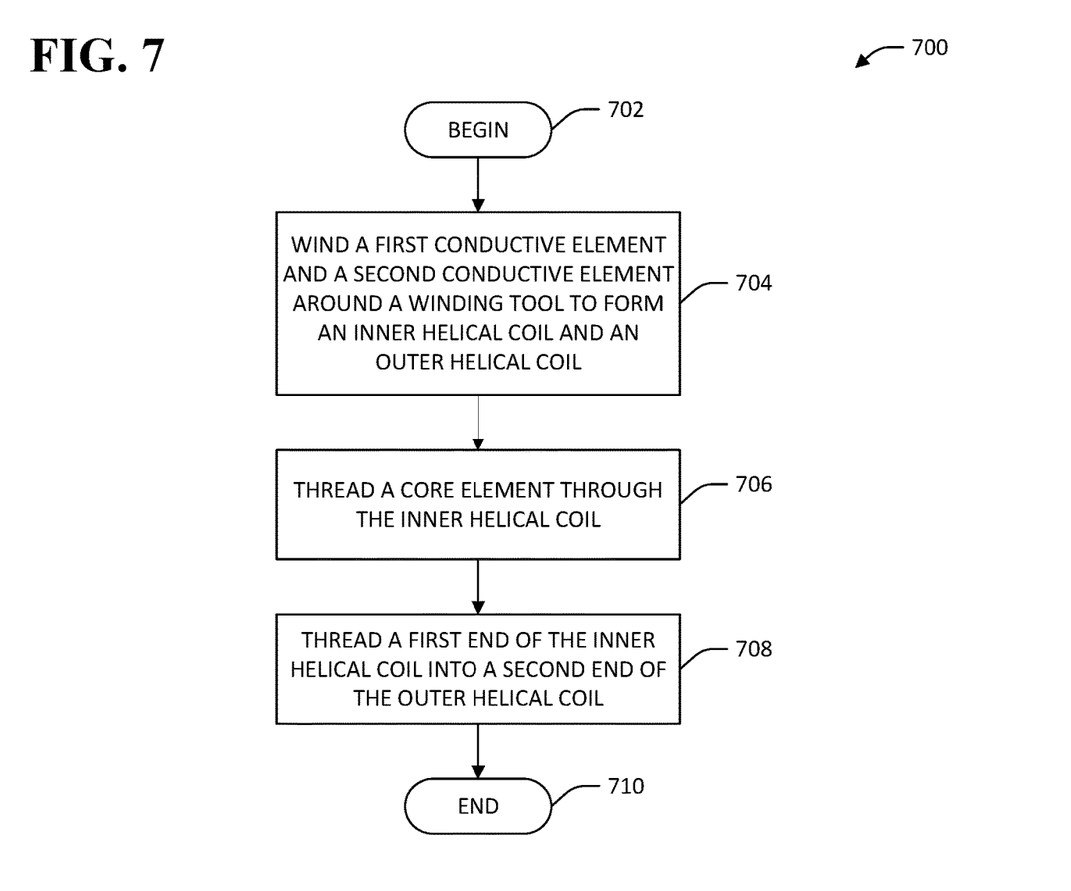
FIG. 7 is a flow diagram that illustrates an exemplary methodology for manufacturing a conductive belt for use in a rotary electrical contact device.

FIGS. 6 and 7 illustrate exemplary methodologies relating to manufacture of embodiments of rotary electrical contact devices described herein. While the methodologies are shown and described as being a series of acts that are performed in a sequence, it is to be understood and appreciated that the methodologies are not necessarily limited by the order of the sequence. For example, some acts can occur in a different order than what is described herein. In addition, an act can occur concurrently with another act. Further, in some instances, not all acts may be required to implement a methodology described herein.

Referring now to FIG. 6, an exemplary methodology 600 for manufacturing a rotary electrical contact device is illustrated. The methodology 600 begins at 602, and at 604 a conductive belt is constructed. The conductive belt can be constructed in accordance with various embodiments described herein. An exemplary methodology 700 for manufacturing a conductive belt for use in a rotary electrical contact device is described in greater detail below with respect to FIG. 7. At 606, a plurality of at least four sheaves are obtained. By way of example, the sheaves can include a first primary sheave, a second primary sheave, and two planetary sheaves. At 608, the conductive belt is installed around the plurality of sheaves such that the conductive belt makes contact with the at least four sheaves. The methodology 600 completes at 610.

Referring now to FIG. 7, an exemplary methodology 700 for manufacturing a conductive belt for use in a rotary electrical contact device is illustrated. The methodology 700 begins at 702, and at 704 a first conductive element and a second conductive element are wound around a winding tool in order to form an inner helical coil and an outer helical coil. By way of example, the first conductive element can be or include a first conductive wire and the second conductive element can be or include a second conductive wire. The winding tool can be a screw-shaped mandrel around which the first and second wire are wound. In an example, the first wire can be seated into threads of the mandrel to form the inner helical coil, while the second wire can be wound around the inner helical coil to form the outer helical coil such that windings of the outer helical coil make contact with two adjacent windings of the inner helical coil. Accordingly, when the first conductive element and the second conductive element are wound around the winding tool, the first conductive element forms an inner helical coil and the second conductive element forms an outer helical coil, where the inner helical coil has a smaller radius than the outer helical coil. At 706, a core element is optionally threaded through the inner helical coil. In an exemplary embodiment, the core element is a substantially inextensible element such as a cord formed of an aramid fiber.

Figure 8:
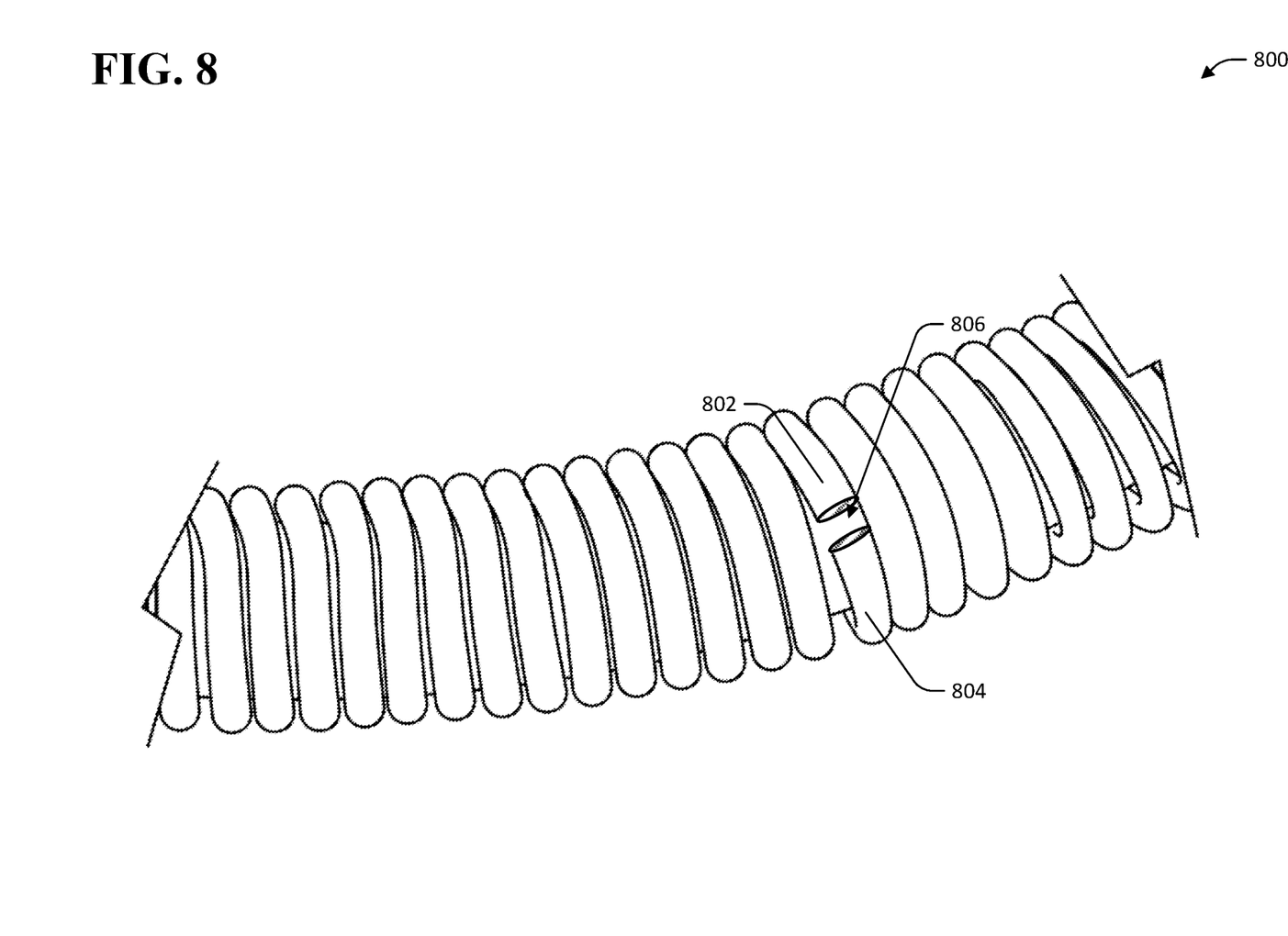
FIG. 8 depicts an exemplary rotary electrical contact device that includes idler sheaves.

At 708, a first end of the inner helical coil is threaded into a second end of the outer helical coil to form the belt. For example, and referring again to FIG. 2, the inner helical coil 202 can be partially unthreaded from the outer helical coil 204 by a plurality of n turns. This results in the belt 200 having a first protruding end at which a first end of the inner helical coil 202 protrudes from a first end of the outer helical coil 204 by n turns, whereas a second sunken end of the inner helical coil 202 is sunken into a second end of the outer helical coil 204 by n turns. The sunken end of the helical coils 202, 204 are then fixed in position while the protruding end of the coil 202 is twisted n or more turns in a direction opposite a direction that would screw the inner coil 202 into the outer coil 204. The protruding end of the coil 202 is then inserted into the outer coil 204 at the sunken end, causing the protruding end of the inner coil 202 to screw into the sunken end of the outer helical coil 204. If the inner coil 202 is twisted more than n turns, a belt closure will be torsionally sprung so that the ends of the belt are forced into compressive contact. By way of example, and referring now to FIG. 8, a belt closure 800 is shown wherein a first end 802 of a belt and a second end 804 of a belt meet at an interface 806. Referring again to FIG. 7, the methodology 700 completes at 710.

It is to be understood that while the ends of the helical coils of the belt can be mechanically joined as described above with respect to FIGS. 7 and 8, in other embodiments the ends of the helical coils can be joined by welding, brazing, soldering, or other means.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rotary electrical contact device, comprising:
   a first sheave disposed about a first axis;
   a second sheave;
   a third sheave;
   a fourth sheave, wherein the third sheave and the fourth sheave revolve around the first axis during operation of the device; and
   a belt that extends around at least a portion of each of the first, second, third, and fourth sheaves such that the belt makes electrical contact with each of the four sheaves, the belt comprising:
   a first helical coil; and
   a second helical coil, the second helical coil being wound around the first helical coil.

2. The rotary electrical contact device of claim 1, further comprising a coupling mechanism that couples the first sheave, the second sheave, the third sheave, and the fourth sheave, wherein the coupling mechanism is configured to apply a force to the third sheave and the fourth sheave such that the belt is placed under tension.

3. The rotary electrical contact device of claim 1, further comprising an idler sheave, the idler sheave configured to apply a force to the belt, wherein the force causes the belt to apply a pressure to at least one of the first, second, third, or fourth sheaves, wherein the idler sheave revolves around the first axis during operation of the device.

4. The rotary electrical contact device of claim 1, wherein the first helical coil comprises a first electrical conductor and wherein further the second helical coil comprises a second electrical conductor.

5. The rotary electrical contact device of claim 1, the first helical coil and the second helical coil having a same pitch such that each winding of the second coil contacts two adjacent windings of the first coil.

6. The rotary electrical contact device of claim 1, the first helical coil and the second helical coil being wound in a same direction.

7. The rotary electrical contact device of claim 1, the first helical coil having a first end, the second helical coil having a second end, the belt being formed by threading the first end of the first helical coil into the second end of the second helical coil.

8. The rotary electrical contact device of claim 1, the belt further comprising a substantially inextensible core element positioned such that the first helical coil and the second helical coil are wrapped around the core element.

9. The rotary electrical contact device of claim 8, the core element comprising an aramid fiber.

10. The rotary electrical contact device of claim 8, the belt further comprising a protective sheath that surrounds the core element, the protective sheath being surrounded by the first helical coil and the second helical coil.

11. The rotary electrical contact device of claim 10, wherein the sheath comprises a polymer.

12. The rotary electrical contact device of claim 1, wherein the second helical coil is composed of a material having a greater hardness than the first helical coil.

13. The rotary electrical contact device of claim 1, wherein the first helical coil comprises a first copper wire and the second helical coil comprises a second copper wire.

14. The rotary electrical contact device of claim 1, wherein at least one of the first helical coil or the second helical coil comprises a copper-clad steel wire.

15. A method for manufacturing a rotary electrical contact device, the method comprising:
   constructing a conductive belt, wherein constructing the conductive belt comprises:
   winding a first conductive element and a second conductive element around a winding tool such that the first conductive element forms an inner helical coil and the second conductive element forms an outer helical coil, the outer helical coil surrounding the inner helical coil, the outer helical coil and the inner helical coil having respective first and second ends; and
   threading a first end of the inner helical coil into a second end of the outer helical coil such that the inner helical coil and the outer helical coil form the conductive belt;

obtaining a plurality of at least four sheaves; and installing the conductive belt around the at least four sheaves such that the conductive belt makes contact with each of the at least four sheaves.

16. The method of claim 15, wherein constructing the conductive belt further comprises threading a core element through the inner helical coil prior to threading the first end of the inner helical coil into the second end of the outer helical coil, wherein the core element is substantially inextensible.

17. An electric machine comprising:

a rotor;

a stator;

a first sheave disposed about a first axis and coupled to the rotor;

a second sheave coupled to the stator;

a third sheave;

a fourth sheave, wherein the third sheave and the fourth sheave revolve around the first axis during operation of the device; and a belt that extends around at least a portion of each of the first, second, third, and fourth sheaves such that the belt makes electrical contact with each of the four sheaves, the belt comprising:

a first helical coil; and a second helical coil, the second helical coil being wound around the first helical coil.

18. The electric machine of claim 17, wherein the electric machine is a motor.

19. The electric machine of claim 17, wherein the electric machine is a generator.

20. The electric machine of claim 17, wherein the belt further comprises a core element that extends through an interior of the belt defined by the first helical coil and the second helical coil, wherein the core element is substantially inextensible.

* * * * *